United States Patent [19]

Gudat

[11] 4,355,364
[45] Oct. 19, 1982

[54] VELOCITY SENSING SYSTEM

[75] Inventor: Adam J. Gudat, Edelstein, Ill.

[73] Assignee: Caterpillar Tractor Co., Peoria, Ill.

[21] Appl. No.: 150,252

[22] PCT Filed: Feb. 4, 1980

[86] PCT No.: PCT/US80/00115
§ 371 Date: Feb. 4, 1980
§ 102(e) Date: Feb. 4, 1980

[87] PCT Pub. No.: WO81/02345
PCT Pub. Date: Aug. 20, 1981

[51] Int. Cl.³ .......................... G01P 3/48; G06F 15/20
[52] U.S. Cl. ..................................... 364/565; 324/166;
324/174; 324/176; 340/870.32
[58] Field of Search ................ 364/424, 565; 324/166,
324/169, 173, 174, 176, 236; 340/38 L, 870.32,
870.33; 73/861.78; 331/25

[56] References Cited
U.S. PATENT DOCUMENTS

| 3,205,352 | 9/1965 | Prucha | 340/38 L X |
|---|---|---|---|
| 3,455,162 | 7/1969 | Michener et al. | 73/861.78 |
| 3,471,844 | 10/1969 | Schugt | 340/870.32 |
| 3,855,525 | 12/1974 | Bernin | 324/173 X |
| 3,989,932 | 11/1976 | Koerner | 340/38 L X |
| 4,045,738 | 8/1977 | Buzzell | 324/174 |
| 4,068,189 | 1/1978 | Wilson | 324/236 X |
| 4,075,563 | 2/1978 | Battle | 324/236 |
| 4,121,112 | 10/1978 | Hartig | 324/173 X |
| 4,182,986 | 1/1980 | Parker | 324/236 |
| 4,243,938 | 1/1981 | Bliven et al. | 324/169 |
| 4,262,251 | 4/1981 | Fujishiro et al. | 324/166 X |

OTHER PUBLICATIONS

Grebene: The Monolithic Phase-Locked Loop—a Versatile Building Block, IEEE Spectrum 1971, pp. 38, 39.
Normand: Phase Locked Loop with Sample Phase Comparator TLE, (France), Mar. 1981, Note p. 83 for connections of MC 14046.

Primary Examiner—Felix D. Gruber
Attorney, Agent, or Firm—Krass & Young

[57] ABSTRACT

A gear speed measuring system which is capable of measuring speeds down to zero, which is capable of use in a rugged environment, and which is relatively insensitive to gear-sensor spacing. The system comprises an electromagnetic sensor (20) connected into the tank circuit of an oscillator (58) to produce an FM signal in which the frequency shifts occur in synchronism with the rotation of a gear (12) or the like. A detector (66) having a reference frequency input (68) converts the FM signal to a digital signal. A microprocessor (48) adjusts the reference frequency (68) as necessary to keep it between the high and low limits of the sensor output. The speed measuring system is applied to the control of the drive unit for a heavy off road vehicle (10) such as a tractor or earth mover.

9 Claims, 4 Drawing Figures

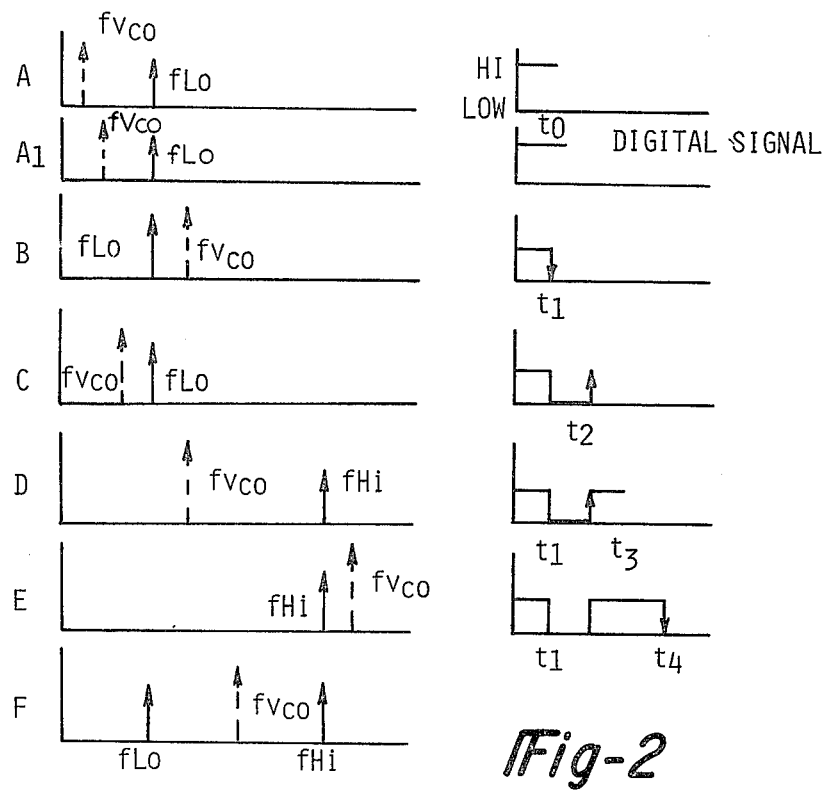
*Fig-2*
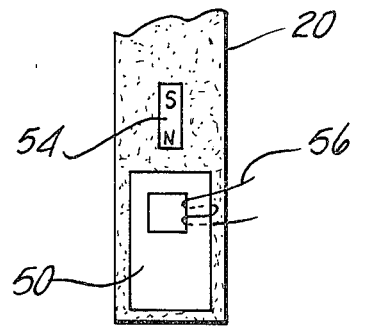
*Fig-3*
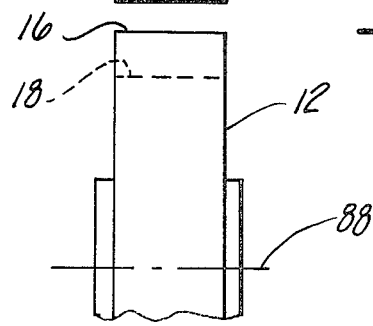

VELOCITY SENSING SYSTEM

DESCRIPTION

1. Technical Field

This invention relates to apparatus for sensing the velocity of metallic parts such as gears and particularly to a velocity sensing system in which a frequency modulated (FM) signal is generated as a result of relative motion between the monitored parts and a sensor. Velocities are detectable over a wide range extending on the low end to zero.

2. Background Art

A determination of the speed and direction of motion of a rotating or linearly translating body such as a drive gear or gear rack is obtainable through the use of a number of prior art devices and techniques; for example, electro optical devices, Hall-effect devices and electromagnetic sensors can be used to generate pulses as the part moves past the sensor and the pulses can then be processed to yield the desired data. Optical devices require a relatively clean environment; Hall-effect devices are expensive and often technically complex. These factors would seem to favor the electromagnetic sensors; however, a practical disadvantage of the electromagnetic sensor is its sensitivity to spacing variations between itself and the translating part, and the dependence of signal strength on the speed of the translating part; i.e., since the signal generator in the sensor is responsive to the change in magnetic flux per unit time, very low speeds of translation render the sensor signal substantially useless in the subsequent data processor. Accordingly, electromagnetic sensors are not generally used where speeds at or near zero are to be detected. One approach to wheel or gear speed measurement in which electromagnetic sensor disadvantages are reduced is disclosed in U.S. Pat. No. 4,050,747 issued to Ruhnau et al on Sept. 27, 1977. That device utilizes counters and data registers responsive to positive and negative transitions of a sensor signal to provide a digital speed indication.

The present invention is directed to overcoming one or more of the problems as set forth above.

DISCLOSURE OF INVENTION

In one aspect of the present invention a velocity sensing system is provided which utilizes a rugged and simple electromagnetic sensor and which has low and zero speed measuring capability. The system comprises an oscillator having a tank circuit which controls the frequency of the oscillator output and a magnetic flux sensitive sensor adjacent the part to define a portion of a flux path which links the part and in which the magnetic flux varies in intensity according to the physical presence of the part. The tank circuit of the oscillator is linked with the flux path so that the electrical tuning of the tank circuit varies as the part passes by the sensor, thus producing an alternating shift in the frequency of the output signal between relatively high and low frequency levels. Part speed is determined as a function of the rate at which the oscillator varies between the high and low frequencies.

In another aspect of the present invention, a part velocity sensing system which provides a digital signal having discrete transitions which occur at a rate in proportion to the speed of the part being measured is provided without the complexity of the multiple counter and register system of prior art U.S. Pat. No. 4,050,747 mentioned above. The velocity sensing system according to this aspect of the invention comprises an oscillator producing a variable frequency signal, a sensor positioned adjacent the part to vary the frequency signal between high and low frequencies as the part or parts pass the sensor, and a detector receiving the signal to produce a digital waveform in which the transitions occur at a rate representing part velocity. Such a system is not only independent of variations in signal strength, but is easily calibrated during startup as well as during normal operations.

BRIEF DESCRIPTION OF DRAWINGS

FIG. 2 is a graphical representation of certain signal frequencies under various operating conditions of the embodiment of FIG. 1.

FIG. 3 is a plan view of a preferred electromagnetic pickup design for use in the motion sensor portion of the system of FIG. 1.

BEST MODE FOR CARRYING OUT THE INVENTION

Figure 1:
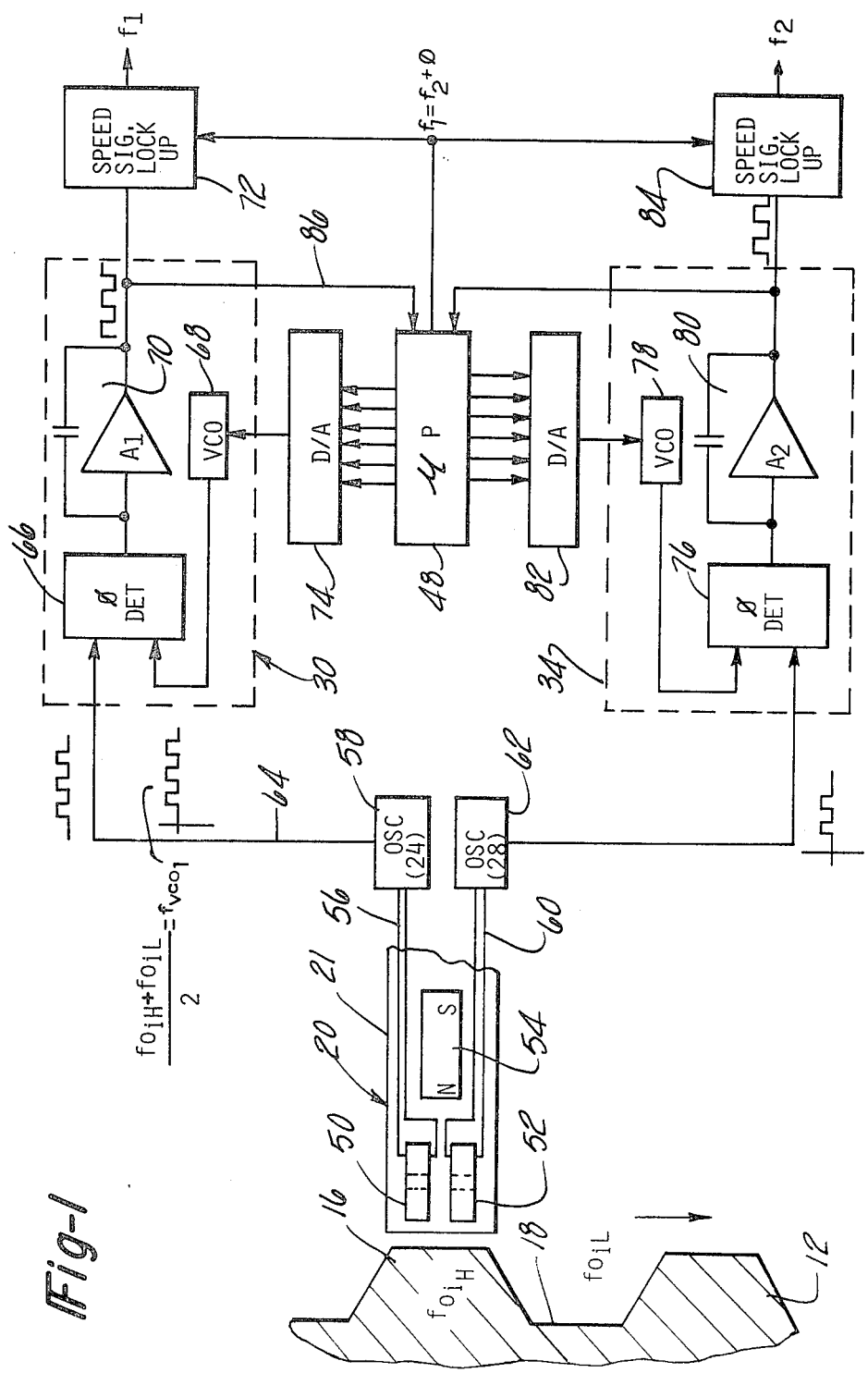
FIG. 1 illustrates an embodiment of the invention as applied to the measurement of gear tooth velocity.

FIG. 1 illustrates an embodiment of the invention utilized to measure the peripheral velocity of teeth 16 in a rotating gear 12. The embodiment comprises a pickup 20 placed closely adjacent the gear 12 such that when the gear 12 moves in the direction of the arrow the end of the sensor body is alternately adjacent the gear teeth 16 and troughs 18. The sensor 20 comprises a body 21 of non-magnetic material such as epoxy or a suitable moldable polymer holding in place a pair of ferromagnetic cores 50 and 52 which are spaced apart in the direction of gear tooth motion by a distance which is substantially less than the circumferential distance between adjacent teeth 16. The body 21 of the sensor 20 also carries therein a unidirectional flux source in the form of a permanent magnet 54 which is oriented such that the flux pattern passes through the cores 50 and 52 and emerges from the end of the body adjacent the gear tooth profile being monitored. It will be apparent to those familiar with electromagnetic phenomena that the amount of flux actually linking the cores 50 and 52 at any given time is closely dependent upon the reluctance of the flux path which, in this case, is a function of the proximity of the gear 12 which is presumed to be constructed of a ferromagnetic material; i.e., a greater flux intensity links the cores 50 and 52 when a tooth 16 is adjacent the sensor body 20 and a lesser flux intensity links the cores when a trough 18 is immediately adjacent the sensor end.

Core 50 is linked by a conductor 56 to form a tank circuit for a conventional oscillator 58. Similarly, core 52 is linked by a conductor 60 to form a tank circuit for conventional oscillator 62. Accordingly, the output signal frequencies of the oscillators 58 and 62 vary between relatively higher and lower values as the gear 12 translates past the sensor 20, the relatively high frequency components representing the proximity of a gear tooth 16 and the relatively low frequency components representing the proximity of a trough 18. Again the signals which are produced by the oscillators 58 and 62 can be made substantially identical but phase shifted by an angle dependent upon the physical spacing between the cores 50 and 52. For signal processing purposes the physical spacing between the cores is preferably less than half of the distance between adjacent teeth 16.

The variable frequency output of oscillator 58 is connected via line 64 to the first input of a phase detector 66 which forms part of the FM to digital converter circuit 30. Phase detector 66 is a conventional component which may comprise, by way of example, a phase locked loop MC 14046B integrated circuit. A second input to phase detector 66 is derived from a voltage controlled oscillator 68 which produces a reference frequency signal which, for normal operating conditions, is set to the mean or average of the high and low frequency outputs of oscillator 58; i.e., the reference frequency signal is preferably half-way between the high and low frequency components. The phase detector 66 compares the inputs thereto and produces an output signal which is a function of the difference between the phases of the two inputs. Thus, the output of the detector 66 is a signal comprising a series of very closely spaced pulses during that portion of the input cycle when the frequency on line 64 is less or more than the output frequency of the voltage controlled oscillator 68. The output signal is applied to an integrator 70 to produce a digital signal which alternates between relatively higher and lower amplitude levels representing the frequency changes in the signal from oscillator 58. This digitized signal is connected back to the microprocessor 48 which controls the reference frequency of the voltage controlled oscillator 68 through a digital to analog converter 74 for initialization and recalibration purposes as hereinafter described. The digital signal is also connected through a latch circuit 72 to the output $f_1$ for processing by subsequent circuitry in accordance with the disclosure of FIG. 4.

The phase shifted signal from oscillator 62 is connected to the FM to digital converter 34 which, like converter 30 comprises a phase detector 76, a voltage controlled oscillator 78, and an integrator 80 to produce a digital output signal $f_2$. A latch circuit 84 is disposed in the signal line for initialization and recalibration purposes to be described. Again, the digital signal is also connected back to the microprocessor 48 for purposes of controlling the reference frequency of voltage controlled oscillator 78 through a control channel which comprises a digital-to-analog converter 82.

Although the operation of the circuit of FIG. 1 is believed to be apparent from the foregoing, a brief review will now be made. As the gear 12 rotates, the presence of a tooth 16 immediately adjacent the sensor 20 results in a tuning of oscillator 58 to the high frequency level and, in delayed phase relation, a similar tuning of oscillator 62 to the high frequency level. The high frequency level is detected by phase detector 66 to be greater than the reference frequency from voltage controlled oscillator 68 and accordingly a high digital level is generated at the output of converter 30. As the gear continues to move, sensor 20 senses a trough 18, the tank circuit 56 retunes oscillator 58 to the low frequency component, the low frequency level is detected by phase detector 66 to be less than the reference frequency from oscillator 68 and, accordingly, a low digital level appears at the output of converter 30. As the gear 12 continues to rotate detector 66 in converter 30 continues to switch back and forth between the high and low conditions producing a digital signal, the levels of which occur at a rate which is synchronous with the rate of appearance of the gear teeth 16 adjacent the sensor 20. The signal level is in no sense dependent upon the rate at which the gear 12 translates past the sensor 20, hence there is no speed limitation imposed on the subject device by the manner in which the electromagnetic sensor 20 operates. Converter 34 functions similarly to produce a second digital signal identical to the first but shifted in phase by a small amount relative thereto.

If all of the physical and electrical parameters of the circuit of FIG. 1 are well known it is theoretically possible to predetermine the high and low output frequency components of the oscillators 58 and 62 and, from this data, preset the reference frequencies which are produced by the voltage controlled oscillators 68 and 78. However, as a practical matter, variations in installation procedure, temperature, gear teeth profile, sensor spacing, and other contributing factors suggest that the reference frequencies be set on an empirical basis by means of a process which is readily carried out by the microprocessor 48 in the embodiment of FIG. 1. The primary steps in the process are now described with reference to the diagram of FIG. 2.

The overall objective of the process is to identify the high and low frequency components which are generated by oscillator 58 as the gear 12 passes by the end of the sensor body 20 and to set the frequency of the voltage controlled oscillator 68 between them. It is presumed that neither the high frequency value nor the low frequency value is initially known.

The first step involves setting the voltage controlled oscillator to a very low frequency, as shown on line A of FIG. 2 such that it is substantially below the frequency of the lowest expected value of either the low or the high frequency component from oscillator 58. Under these circumstances, a high digital signal level is generated and presented to the microprocessor 48 on signal line 86. The frequency of the voltage controlled oscillator 68 ($f_{vco}$) is repeatedly increased by increments of about 1 kHz by an appropriate signal from microprocessor 48. The microprocessor 48 re-examines the output signal of converter 30 after each increment to determine if the frequency from oscillator 58 (FIG. 2-A1) has exceeded the frequency from vco 68. As shown on line B of FIG. 2, when the incremental increase occurring at $t_1$ raises $f_{vco}$ above the unknown output of oscillator 58, a transition occurs at the output of the integrator 70. This transition identifies the location of $f_{Lo}$ within the resolution permitted by the increment size but does not provide enough information to determine whether the identified frequency is $f_{hi}$ or $f_{Lo}$. Therefore, the identified frequency value is temporarily stored in memory locations corresponding to both $f_{hi}$ and $f_{Lo}$.

The output of the voltage controlled oscillator 68 is stepped back and forth across the identified frequency ($f_{Lo}$) for as long as it remains unchanged. Each such step produces a transition at the output of integrator 70. When the signal frequency from oscillator 58 changes either increasingly or decreasingly, the incremental reciprocations of $f_{vco}$ produce no further transitions. The output of integrator 70 thus remains either high or low, depending on the direction of change in the signal being identified. The level at which the signal from integrator 70 remains determines whether the signal frequency just found is either $f_{hi}$ or $f_{Lo}$; e.g. if it remains high, the signal is $f_{Lo}$.

The output of oscillator 68 is now incremented or decremented toward the remaining unknown frequency from oscillator 58. In the illustrated case, the remaining unknown is $f_{hi}$ and the persistent high signal state after $t_2$ positively declares this to be the case. Accordingly, the output from VCO is incremented until at $t_4$ another transition in the output of integrator 70 occurs. This final transition identifies $f_{hi}$ and the value thereof is caused by microprocessor 48 to be stored in the $f_{hi}$ memory location, replacing the $f_{Lo}$ signal previously in that location. Finally, $f_{hi}$ and $f_{Lo}$ are averaged and $f_{vco}$ is set exactly half-way between the two frequencies, as shown on line F of FIG. 2. Under these conditions the output of oscillator 58 alternates back and forth between $f_{Lo}$ and $f_{Hi}$ to produce an alternating digital signal at $f_1$ of FIG. 1.

Substantially the same method is programmed for periodic utilization in the system of FIG. 1 for recalibration purposes except that the starting point is the last stored value in the microprocessor 48 instead of the very low frequency generated at initial calibration. This method is preferably carried out on a recurring basis and between transitions of the digital output signal $f_1$ to account for gear eccentricities, wobble, temperature shifts and other changes in operating conditions which might otherwise disturb the output frequencies enough to generate false transitions. To prevent the artificial shifts in $f_{vco}$ from generating transitions during the recalibration process the microprocessor 48 latches the circuits 72 and 84 to hold the last generated digital signal level until the recalibration method is complete.

Referring now to FIG. 3, the preferred form of a sensor 20 is illustrated adjacent the teeth 16 of a gear 12 which is adapted for rotation about a central axis 88. The sensor 20 comprises a body in the form of an epoxy bar which has been molded around a small permanent magnet 54 and a pair of ferrite cores, only core 50 being apparent in FIG. 3. Core 50 is preferably of elongated configuration with the aperture receiving winding 56 being offset away from the terminal end of the sensor body. With this construction the sensor 20 may be set very close to the periphery of the gear teeth 16, much closer than is indicated by the relative spacing in FIG. 3, with the confidence that accidental contact due to eccentricity or shifting under load will merely wear away the elongated end of the core 50 with little or no appreciable change in magnetic characteristic and without breaking or altering the close loop nature of the core 50.

INDUSTRIAL APPLICABILITY

Figure 4:
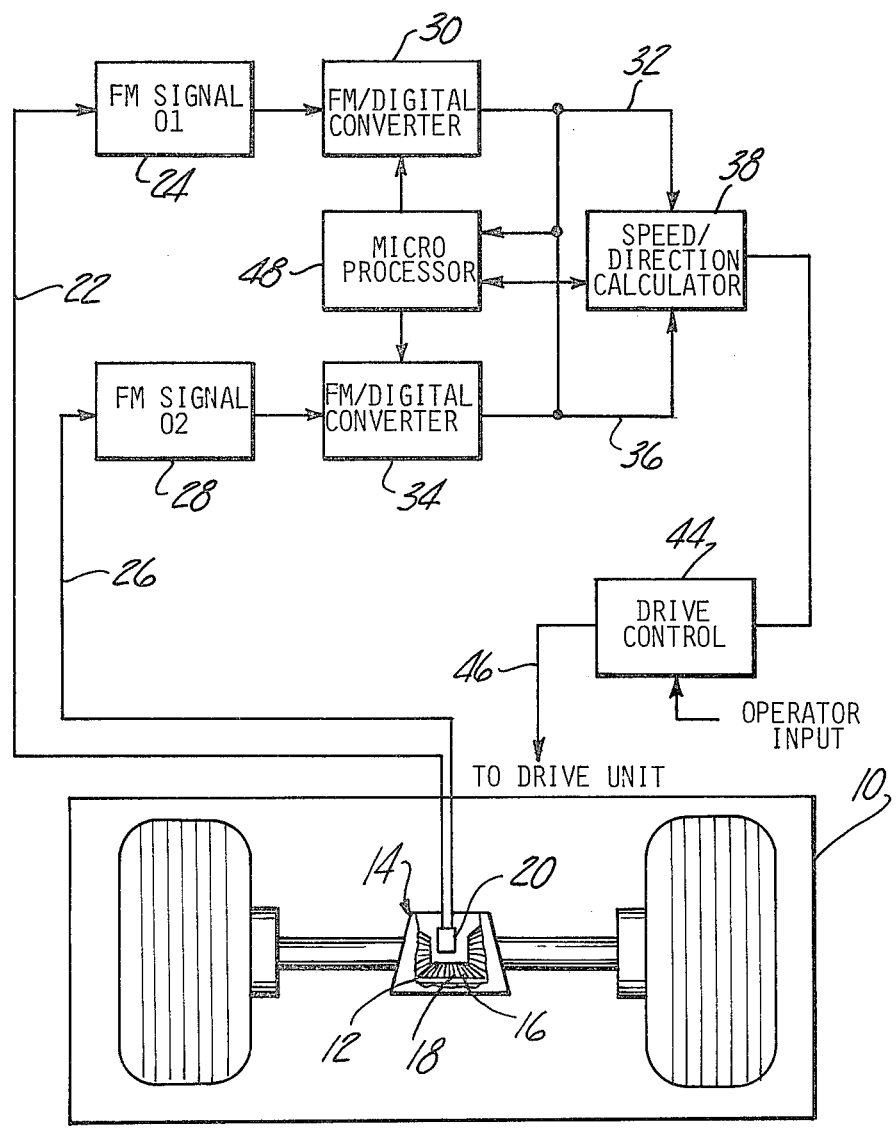
FIG. 4 is a block diagram of an embodiment of the invention in a speed control system for off-road vehicles.

FIG. 4 illustrates a system embodying the invention as applied to the control of the drive unit for a heavy off road vehicle 10 such as a tractor or earth mover. The drive unit of the vehicle 10 includes a differential 14 with a bevel gear 12 whose speed and direction of rotation is to be determined through the embodiment of the invention. Gear 12 exhibits peripheral gear teeth 16 separated by troughs 18 to mesh with matting gears, the teeth 16 and troughs 18 representing relatively well defined areas of alternately opposite physical characteristics.

Disposed adjacent the periphery of gear 12 and suitably mounted on the vehicle 10 is an electromagnetic sensor 20 having individual pickups of which the first is connected by circuit 22 to an FM signal generator 24. The output of generator 24 is a frequency modulated signal which varies discretely and abruptly between relatively higher and lower frequency levels as the gear 12 rotates about its axis so as to cause a translation of the gear profile past the sensor 20. In the illustrated embodiment, the presence of a gear tooth 16 immediately adjacent the sensor 20 results in a relatively high frequency output signal from FM signal generator 24 and the presence of a trough 18 immediately adjacent the sensor 20 results in a relatively low frequency signal. The generator 24 is designed such that the shift between frequency levels is relatively abrupt and generally synchronous with the linear translation of the gear 12.

The second pickup in sensor 20 is connected by line 26 to a second FM signal generator 28, the output of which is identical to the output of signal generator 24 but shifted in phase by a phase angle which is related to the physical distance between the pickups measured along a line tangent to the periphery of gear 12 immediately in the area of the sensor 20.

The frequency modulated output signal from generator 24 is connected to an FM to digital signal converter 30 which functions in the manner of a frequency detector to produce a digital output signal at 32, the amplitude levels of which are representative of the relatively high and low frequency components of the FM signal from generator 24. In brief, the converter 30 digitizes the signal from generator 24 so that it may be processed in later circuitry to yield speed and direction data.

FM signal generator 28 is similarly connected to a converter unit 34 which is identical to unit 30 to produce a second digitized signal at 36. This signal is identical to but phase shifted from the signal at 32. Both of the signals at 32 and 36 are connected as inputs to a speed and direction calculator 38 which is a prior art device. As will be apparent to those skilled in the art, speed may be readily determined by a simple process of counting clock pulses between transitions of the digital signal and direction may be determined by comparing the phase shift between the signals at 32 and 36. The speed and direction calculator unit 38 may be interconnected with a microprocessor 48 which is a small limited capacity digital computer carried on board the vehicle 10 for speed and direction control purposes. The microprocessor 48 is also interconnected with the first and second phase converter units 30 and 34 for initialization and recalibration purposes to be described hereinafter in greater detail.

The data from the drive calculator 38 is connected by a suitable multiconductor bus to a drive control unit 44 to provide control signals to the transmission unit which ultimately supplies power to gear 12. The drive control unit 44 is a feedback system in which the control signal on channel 46 drives to zero any differences between operator input commands and actual speed and/or direction signals from the unit 38.

The velocity sensor of the invention may be applied as described above to control the speed of vehicle drive components. In addition it may be used to monitor gear speed in many other industrial applications such as position control systems, automatic milling machines, die set accelerators, length control systems for tube mills, conveyors and tachometers. In addition, the invention may be applied to the counting and/or monitoring of gear rack teeth and discrete parts such as castings and stampings which move linearly rather than angularly.

It is to be understood that the invention has been disclosed with reference to illustrative embodiments and that various modifications and additions will be apparent to those skilled in the art. It is to be further understood that the invention may be adapted to applications other than vehicle drive systems.

Other aspects, objects and advantages of this invention can be obtained from a study of the drawings, the disclosure and the appended claims.

I claim:

1. A velocity sensing system for parts (12) such as gear teeth having relatively well defined areas (16) of alternately opposite physical presence comprising:

an electronic oscillator (58) having an output (64) and a tank circuit (56), said tank circuit controlling the frequency of signals on said output;

a magnetic sensor (20) disposed adjacent the part (12) and defining a flux path which links said part and in which the magnetic flux intensity varies according to the physical presence of the part immediately adjacent the sensor (20);

said tank circuit (56) linking said flux bath to vary the frequency of the oscillator output signal alternately between a high and a low frequency as the part (12) moves relative to the sensor (20);

means (68) for producing a reference signal having a frequency between the high and low frequency of the oscillator output signal;

means (66, 70) for comparing the oscillator output signal to the reference signal and producing digital outputs of first and second levels as the frequency of the oscillator output is greater than and less than, respectively, the frequency of the reference signal; and means (38) for determining the velocity of said part (12) relative to the sensor (20) according to the time interval between the first and second level digital outputs.

2. Apparatus as defined in claim 1 further comprising:

means (48) for varying the reference signal frequency according to variations in the oscillator output frequency to maintain the reference signal frequency between said high and low frequencies for substantially all operating conditions.

3. Apparatus as defined in claim 1 wherein the magnetic sensor (20) comprises a core (50) of ferromagnetic material, a source (54) of flux, and a support body supporting the core and the flux source in magnetic juxtaposition, the tank circuit (56) comprising a coil linking the core to vary the inductance thereof with flux passing through the core.

4. Apparatus as defined in claim 2 further including a second oscillator (62), sensor (52), detector (76) operatively connected for producing a second detector output signal which is identical to but phase-shifted from the first detector output signal.

5. In a motion detector for parts (12) such as gears which have relatively well defined areas of alternately opposite physical characteristics;

signal generator means (24) for producing an alternating signal;

sensor means (20) adjacent said part and connected to said generator means (24) for alternatively varying said signal between higher and lower frequencies as the opposite areas (16, 18) of said part are adjacent said sensor means (20);

detector means (30) connected to the generator means (24) for receiving the variable frequency signal and producing a digital signal having first and second levels representing the alternately higher and lower frequencies of said signal, said detector means (30) including a reference frequency generator means (68) for generating a reference signal having a frequency between said higher and lower frequencies;

means (38) for determining the velocity of said part (12) relative to the sensor means (20) according to the time interval between said first and second levels of said digital signal.

6. Apparatus as defined in claim 5 wherein the detector means (30) comprises:

comparator means (66) for receiving the variable and reference frequency signals, and output means (70) for producing a first digital level in response to the variable frequency being higher than the reference and a second digital level in response to the variable frequency being lower than the reference;

said apparatus further comprising means (48,74) for maintaining the reference frequency between the high and low levels of the variable frequency signals.

7. Apparatus as defined in claim 6 wherein said means (48,74) for maintaining said reference frequency includes a digital processor (48) for resetting the reference frequency to compensate for shifts in the variable frequency signal.

8. Apparatus as defined in claim 7 further including latch means (72) having an input and an output, the input being connected to receive the digital signal;

the latch means (72) being responsive to a control signal from said digital processor (48) to maintain on said output a signal equal to one of the digital levels irrespective of variations in said levels at said input.

9. A method of operating an FM velocity detector for relatively moving parts characterized by recurring areas of varying physical presence comprising the steps of:

generating a data signal which alternates between relatively low and high frequencies as the areas translate past a sensor location, generating a reference frequency signal, comparing the data and reference signals to generate an output signal having level transitions corresponding to frequency crossings between said reference and data signals and being indicative of the velocity of the moving parts, identifying the low and high frequencies, maintaining the reference frequency mediate the low and high frequencies.

* * * * *